(12) United States Patent
Stroud

(10) Patent No.: US 12,296,226 B1
(45) Date of Patent: *May 13, 2025

(54) METHOD AND SYSTEM UTILIZING A GOLF SHOT API PROXY

(71) Applicant: Topgolf International, Inc., Dallas, TX (US)

(72) Inventor: Ethan D. Stroud, Liberty Hill, TX (US)

(73) Assignee: Topgolf International, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,951

(22) Filed: May 31, 2024

Related U.S. Application Data

(63) Continuation of application No. 18/369,007, filed on Sep. 15, 2023, now Pat. No. 11,998,800, which is a continuation of application No. 18/208,164, filed on Jun. 9, 2023, now Pat. No. 11,779,809.

(60) Provisional application No. 63/393,384, filed on Jul. 29, 2022.

(51) Int. Cl.
  *A63B 24/00* (2006.01)
  *A63B 69/36* (2006.01)

(52) U.S. Cl.
  CPC ...... *A63B 24/0021* (2013.01); *A63B 69/3694* (2013.01); *A63B 2024/004* (2013.01); *A63B 2024/0056* (2013.01); *A63B 2220/807* (2013.01); *A63B 2220/89* (2013.01); *A63B 2225/20* (2013.01); *A63B 2225/72* (2013.01)

(58) Field of Classification Search
  CPC ............ A63B 24/0021; A63B 69/3694; A63B 2024/004; A63B 2024/0056; A63B 2220/807; A63B 2220/89; A63B 2225/20; A63B 2225/72
  USPC .......................................................... 473/3
  See application file for complete search history.

(56) References Cited

U.S. PATENT DOCUMENTS

| | | | | |
|---|---|---|---|---|
| 5,413,345 | A * | 5/1995 | Nauck ................. | A63B 24/0021 348/157 |
| 9,675,862 | B2 * | 6/2017 | Solheim ............. | A63B 24/0003 |
| 10,610,757 | B1 * | 4/2020 | Marty .................. | A63B 63/083 |
| 2005/0227792 | A1 * | 10/2005 | McCreary .......... | A63B 24/0021 473/409 |
| 2020/0269089 | A1 * | 8/2020 | Tuxen ..................... | G01S 13/88 |
| 2023/0085842 | A1 * | 3/2023 | Hugmark .................. | G06T 7/20 473/156 |

* cited by examiner

*Primary Examiner* — Pierre E Elisca
(74) *Attorney, Agent, or Firm* — Michael A. Catania

(57) ABSTRACT

A method and system for providing shot tracking data to a client device is disclosed herein. The system includes multiple golf ball tracking sensors positioned at multiple golf driving ranges, multiple shot application programming interfaces (API), and a shot API proxy. Each of the shot APIs is configured to receive shot data from each of the golf ball tracking sensors at a corresponding golf driving range venue such as a TOPGOLF® entertainment venue.

20 Claims, 8 Drawing Sheets

METHOD AND SYSTEM UTILIZING A GOLF SHOT API PROXY

CROSS REFERENCES TO RELATED APPLICATIONS

The Present Application is a continuation application of U.S. patent application Ser. No. 18/369,007, filed on Sep. 15, 2023, which is a continuation application of U.S. patent application Ser. No. 18/208,164, filed Jun. 9, 2023, now U.S. Pat. No. 11,779,809, issued on Oct. 10, 2023, which claims priority to U.S. Provisional Patent Application No. 63/393,384, filed on Jul. 29, 2022, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a golf shot API proxy utilized with golf range entertainment venues.

Description of the Related Art

Currently, TOPGOLF™ shot trace events can only be done if the client application was connected to the same local network as the local TOPTRACER™ API. Also, to integrate with the local TOPTRACER™ API, a client app had to either be compatible with websocket communication, or if not, use "HTTP Long Polling" as a way to request and receive shot events.

The disadvantages included that any third-party client that wanted to receive shot events would need to first authenticate to the local private network at a TOPGOLF golf driving range entertainment venue. This essentially prevented any non-TOPGOLF application from receiving such events as access to the local private network would pose a security risk.

In the case of the TOPTRACER™ Range App, this created friction with the app users as they would need to gain access to the respective driving range's WiFi before being able to use said app HTTP Long Polling consumes server resources as the server persists a client connection for a specified amount of time.

This presents a problem if there are multiple clients requesting the same shot event, as the load on the server will increase with the number of persisted requests.

As such, making specific shot events available to more than one client at a time has a detrimental effect to the servers handling the request; one of the reasons why cross-bay/cross-venue gameplay has yet to be implemented.

Further, Long Polling also, in certain situations, does not guarantee proper ordering or delivery of responses if there is a high volume of requests from the same client app.

This could potentially pose a problem in a cross-bay/cross-venue scenario as the ordering of shot events could be crucial to the game experience.

Further, User experience would also be impacted if a response for an event is never received by the client app.

BRIEF SUMMARY OF THE INVENTION

A primary purpose of the solution is to democratize/publicize shot event data in such a way that it: Allows for client apps to access shot event data, securely, over the public internet, in a manner that simplifies the process of integration, allows for the scaling of client app connections to large volumes, while only increasing local Shot API server load by a minimal amount, and allows for shot event data to be shared across bays, venues, and devices/platforms/client app.

One aspect of the present invention is a system for providing shot tracking data to a client device. The system comprises multiple golf ball tracking sensors positioned at multiple golf driving ranges, multiple shot application programming interfaces (API), and a shot API proxy. Each of the shot APIs is configured to receive shot data from each of the golf ball tracking sensors at a corresponding golf driving range. The shot API proxy is configured to receive shot data from each of the shot APIs. The shot API proxy is configured to receive calls for shot data from a client device. The shot API proxy is configured to transmit shot data to the client device.

Another aspect of the present invention is a method for providing shot tracking data to a client device. The method includes generating shot data at a plurality of golf ball tracking sensors positioned at a plurality of golf driving ranges. The method also includes receiving, at a plurality of shot application programming interfaces (API), shot data from each of the plurality of golf ball tracking sensors. The method also includes receiving shot data at a shot API proxy from each of a plurality of shot APIs. The method also includes receiving a call for shot data at the shot API proxy from a client device. The method also includes transmitting the shot data from the shot API proxy to the client device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
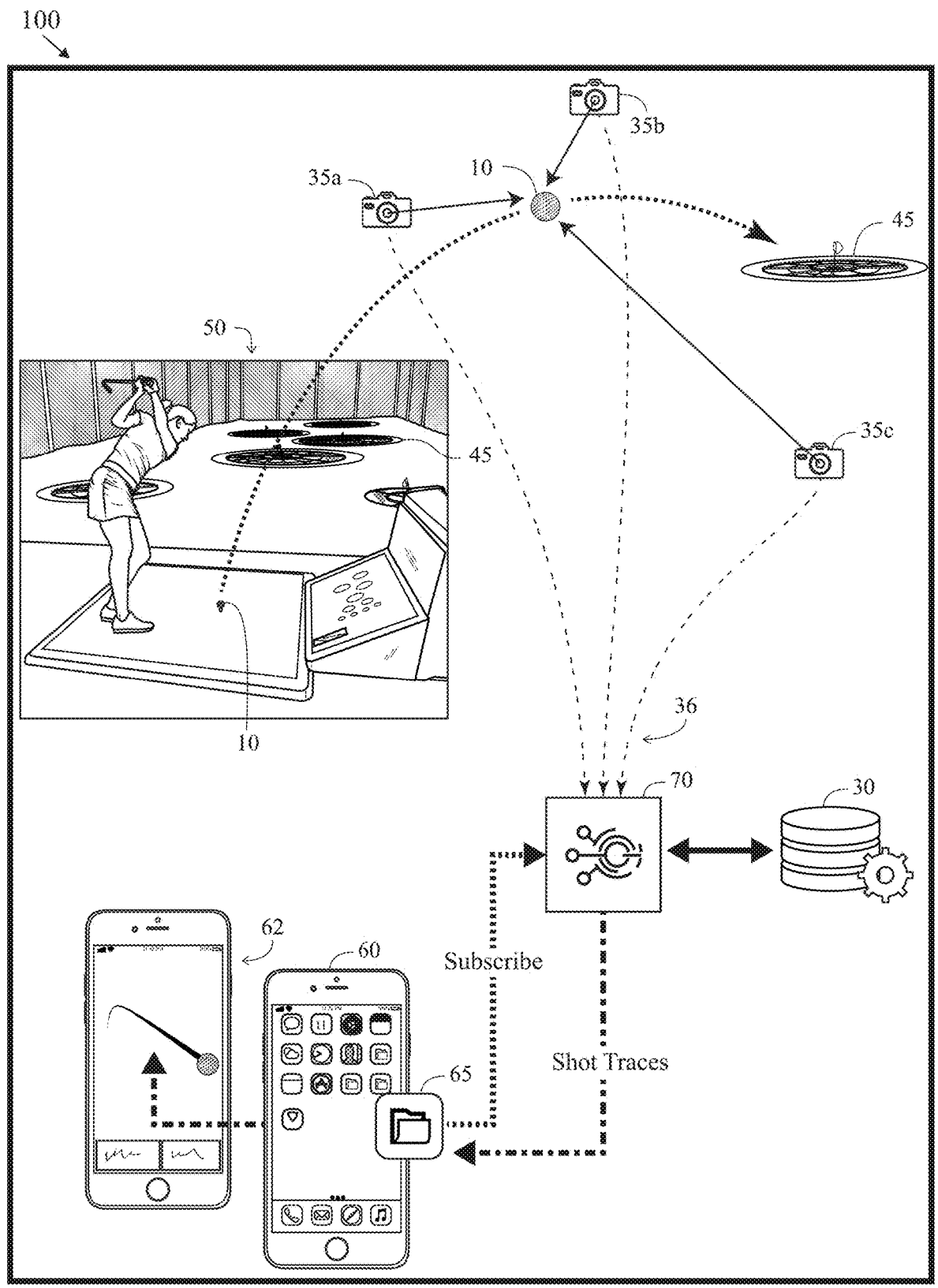
FIG. 1 is a block diagram of a system for providing shot tracking data to a client device.

FIG. 1 shows a system 100 for providing shot tracking data to a client device. The system 100 preferably comprises multiple golf ball tracking sensors 35a-c, positioned at multiple golf driving range venues 50 (such as TOPGOLF® entertainment venues), multiple shot application programming interfaces (API) 70, and a shot API proxy 80 (shown in FIG. 4). Each of the shot APIs is configured to receive shot data from each of the golf ball tracking sensors at a corresponding golf driving range 50. The shot API proxy 80 is configured to receive shot data from each of the shot APIs 70. The shot API proxy 80 is configured to receive calls for shot data from a client device 60. The shot API proxy 80 is configured to transmit shot data to the client device 60. As golf ball 10 shot towards a target 45 is traced by cameras 35*a-c* placed around the golf facility 50. The shot trace data points from the cameras 35*a-c* feed 36 into the shot API 70, which is in communication with a database 30. A user can subscribe to receive shot info through the shot tracer application 65 on the mobile device 60. The shot traces are sent to the shot tracer app 65 from the API 70. The shot trace and details are displayed on the mobile device's screen 62, using the app 65.

Figure 2:
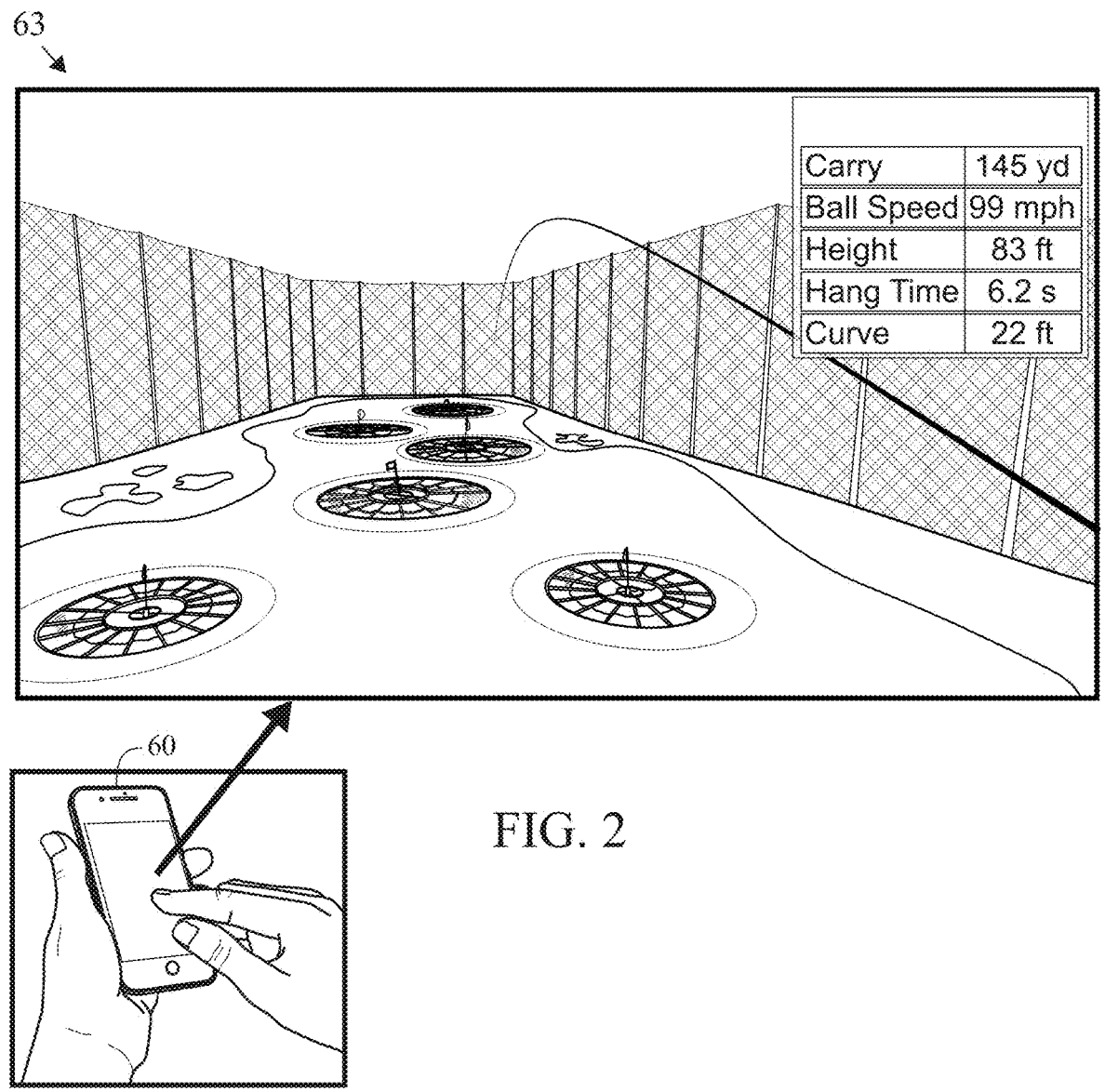
FIG. 2 is an illustration of a screen shot of a golf driving range as shown on a mobile app of a mobile device.

FIG. 2 shows a screen shot 63 of a golf driving range as shown on a mobile app of a mobile device 60.

Figure 3:
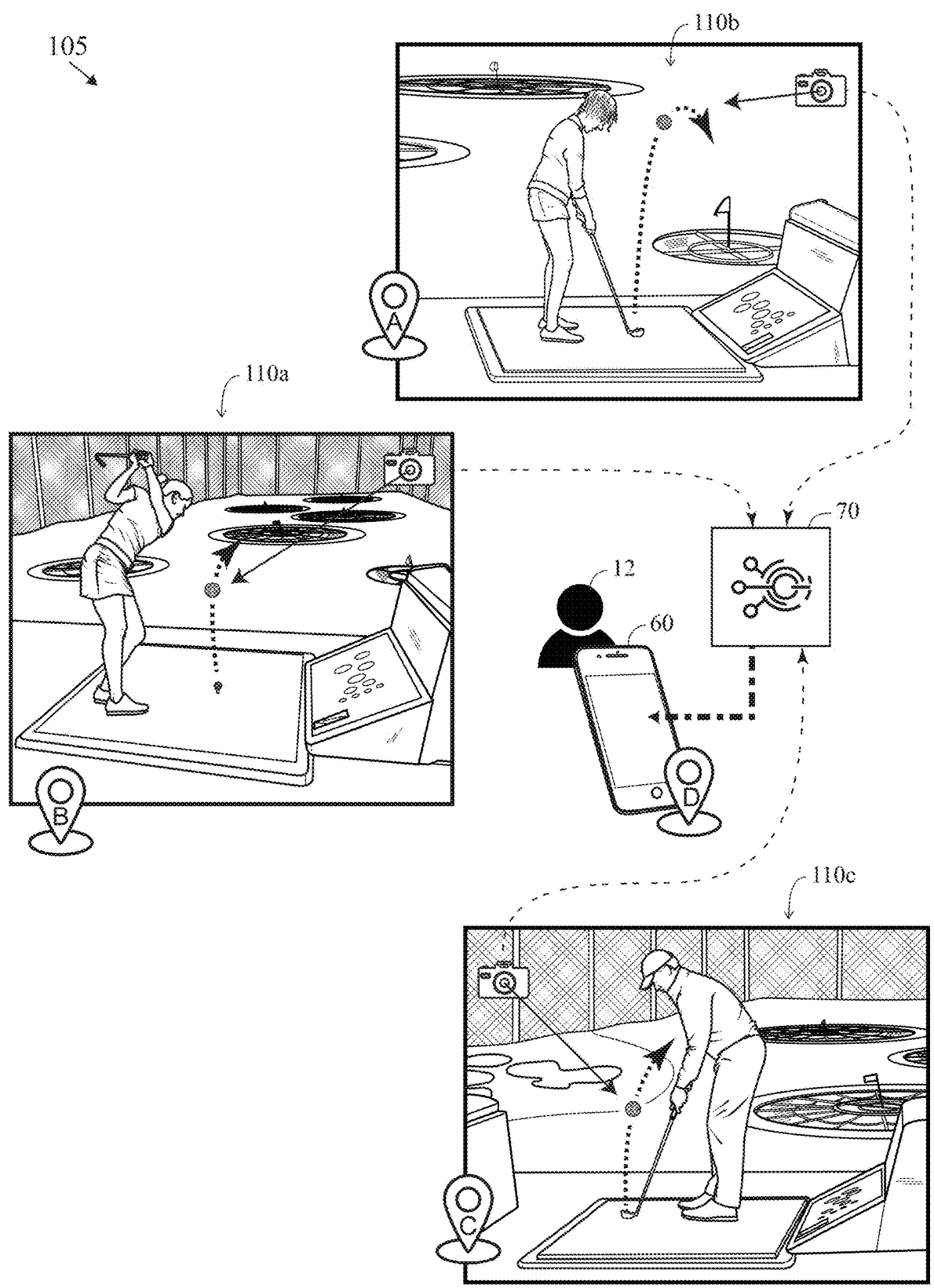
FIG. 3 is an illustration of a system for providing shot tracking data to a client device from multiple golf driving ranges.

FIG. 3 shows a system 105 for providing shot tracing data to a client device 60. Users at different ranges 110*a*-110*c* in separate locations generate shot trace data with each shot. A subscriber 12 with a mobile device 60, in an altogether separate location, can receive shot trace data from any of the ranges 110*a-c* that the user 12 subscribes to.

Figure 4:
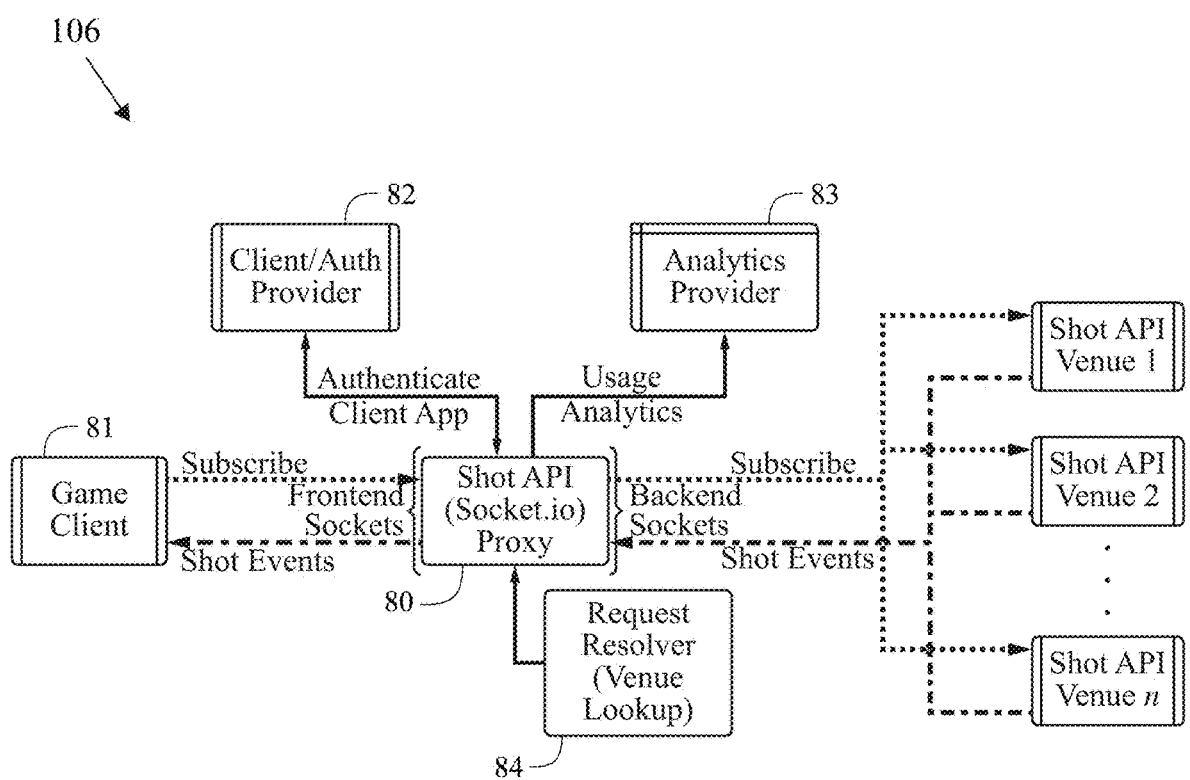
FIG. 4 is a flow chart of a method for providing shot tracking data to a client device.

FIG. 4 shows a shot API proxy approach 106 for providing shot tracing data to a client device 60. This approach features a centralized socket.io based shot API proxy 80, to which Game Clients 81 connect. A Client/Authentication Provider 82 authenticates incoming socket.io requests. An asynchronous push for client usage analytics to an Analytics Provider 83. A Request Resolver 84 implements venue lookup to resolve target Shot API path. Mapping between client (frontend) sockets and Shot API (backend) sockets is maintained by sockets management. Backend socket's lifecycle is tied with that of mapped Frontend sockets. Backend emissions are forwarded to mapped frontend sockets.

Figure 5:
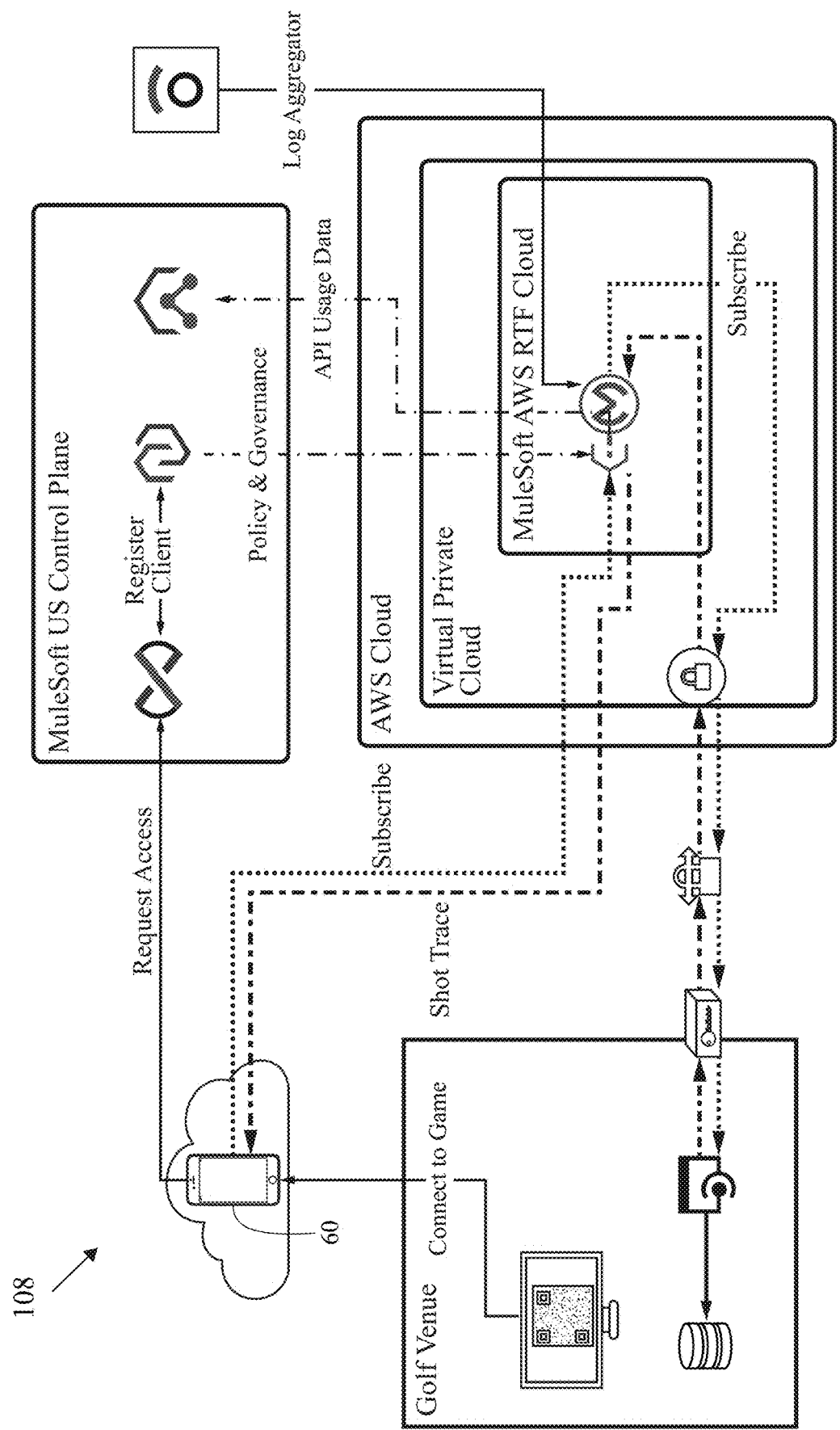
FIG. 5 is a block diagram of a method for providing shot tracking data to a client device.

FIG. 5 is a block diagram 108 of a method for providing shot tracing data to a client device 60.

The solution will be implemented as such:

An AsyncAPI, developed with the Mulesoft platform, deployed to TOPGOLF's Runtime Fabric Cluster (Mulesoft,) runs in a cloud computing service such as Amazon Web Services (AWS).

This AsyncAPI serves as a public proxy for the underlying Shot API instances running at each golf driving range (venue) 50.

The API is secured with the API Policies supplied by Mulesoft's Anypoint Platform, as well as any custom policies deemed necessary.

For a client app 65 to subscribe to shot event data, it will first authenticate against the policies applied to the AsyncAPI.

Once authenticated, the client app 65 will request subscriptions to specific bay(s) at specific venue(s) 50.

Behind the AsyncAPI is an integration workflow containing a custom built Socket.io connector. The Socket.io connector handles the subscription requests from the client apps 65 on the mobile device 60 of the users.

The workflow will first make an HTTP call to an internal API containing hostnames for each of the individual Shot APIs 70.

Once the required hostname(s) is (are) pulled, the workflow uses the custom Socket.io connector to establish a connection to the underlying Shot API(s) 70.

After a successful connection attempt, all shot events will be sent back through the Socket.io connector, back through the AsyncAPI, and to the client in real-time; similar to a push notification.

This solution leverages the following key cutting edge technologies and maintains their inherent positive characteristics:

AsyncAPI deployed to an instance of a Mulesoft RTF
Mulesoft Anypoint Platform (API Manager, Monitoring, Log forwarding)
Socket.io
AWS Infrastructure (EC2, NLB, Route53, etc. . . . )
Other features of the present invention include:
Custom Socket.io Connector developed with the Mulesoft Connector SDK;
AysncAPI as a proxy to a Socket.io implementation;
The ability for shot events to be broadcast securely with Public internet endpoints;
The ability for "multiplexing", which allows for "n" number of clients to subscribe to events while only requiring a single subscription to the underlying Shot API 70 for those events, which allows for cross-bay/cross-venue/cross-device gameplay.

Figure 6:
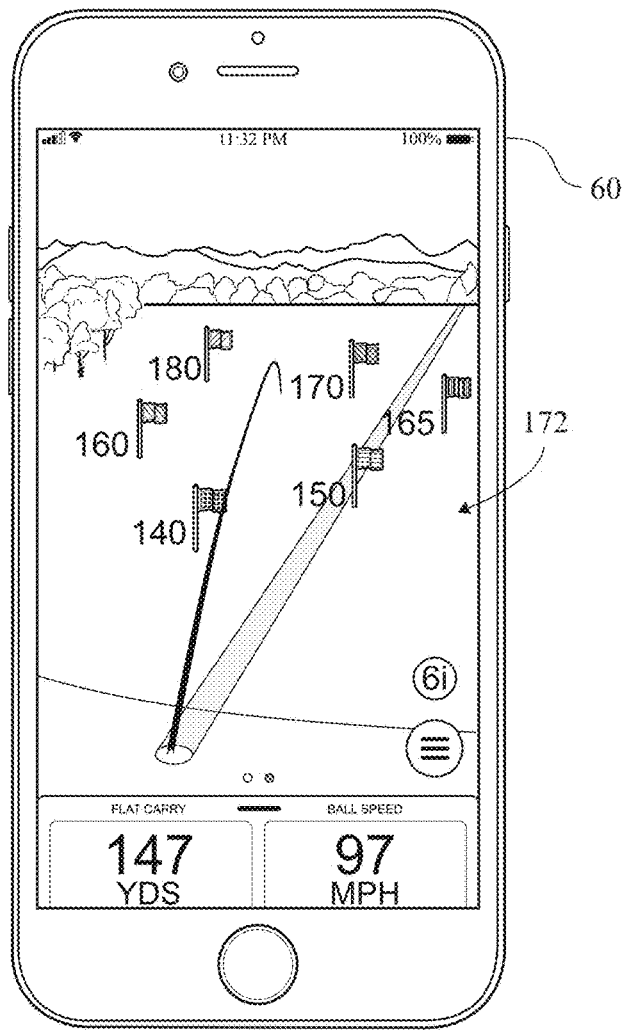
FIG. 6 is an illustration of a screenshot from a shot tracer application on a mobile device.
Figure 7:
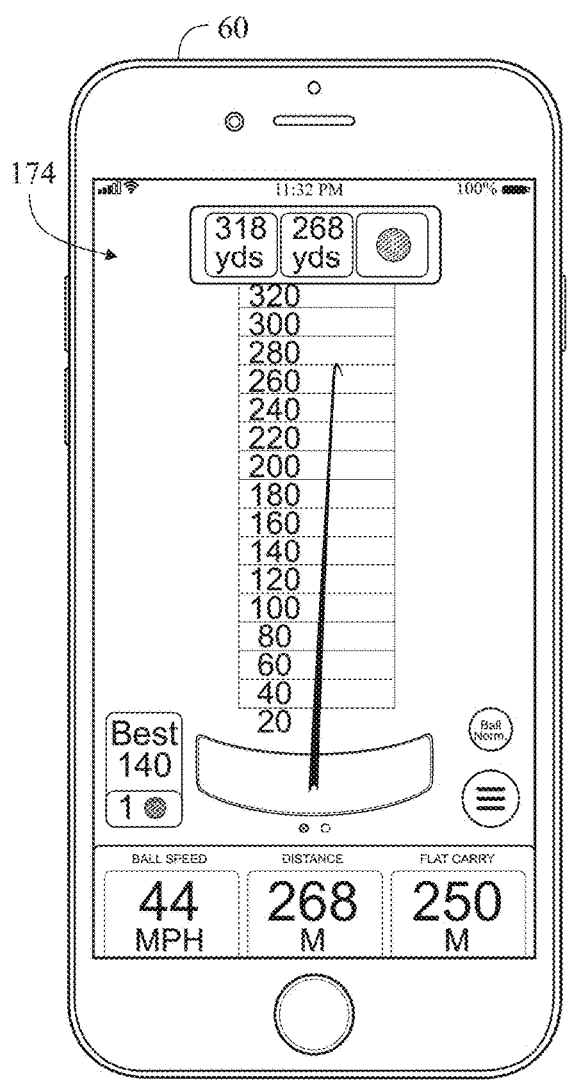
FIG. 7 is an illustration of a screenshot from a shot tracer application on a mobile device.

FIG. 6 and FIG. 7 are screenshots 172 and 174, respectively, of a shot tracer application 65 on a mobile device 60.

Figure 8:
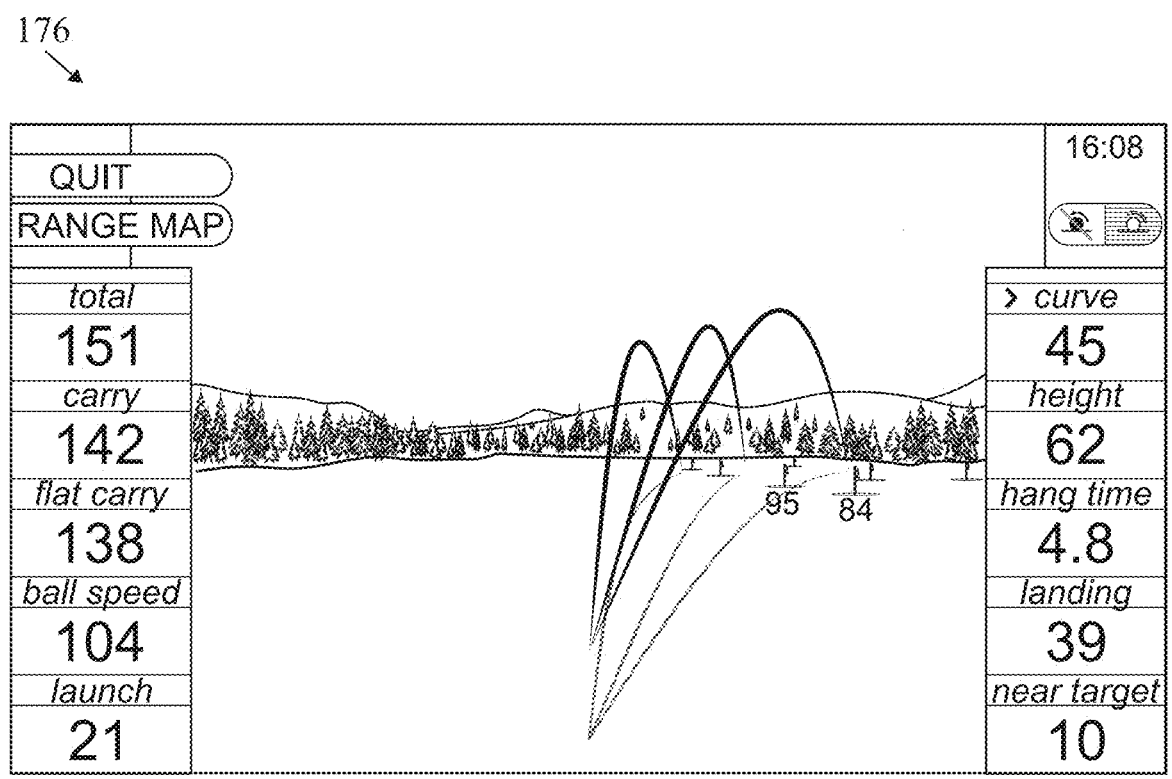
FIG. 8 is an illustration of a screenshot from a shot tracer application.

FIG. 8 is a screenshot 176 of a range map of a shot tracer application 65.

Figure 9:
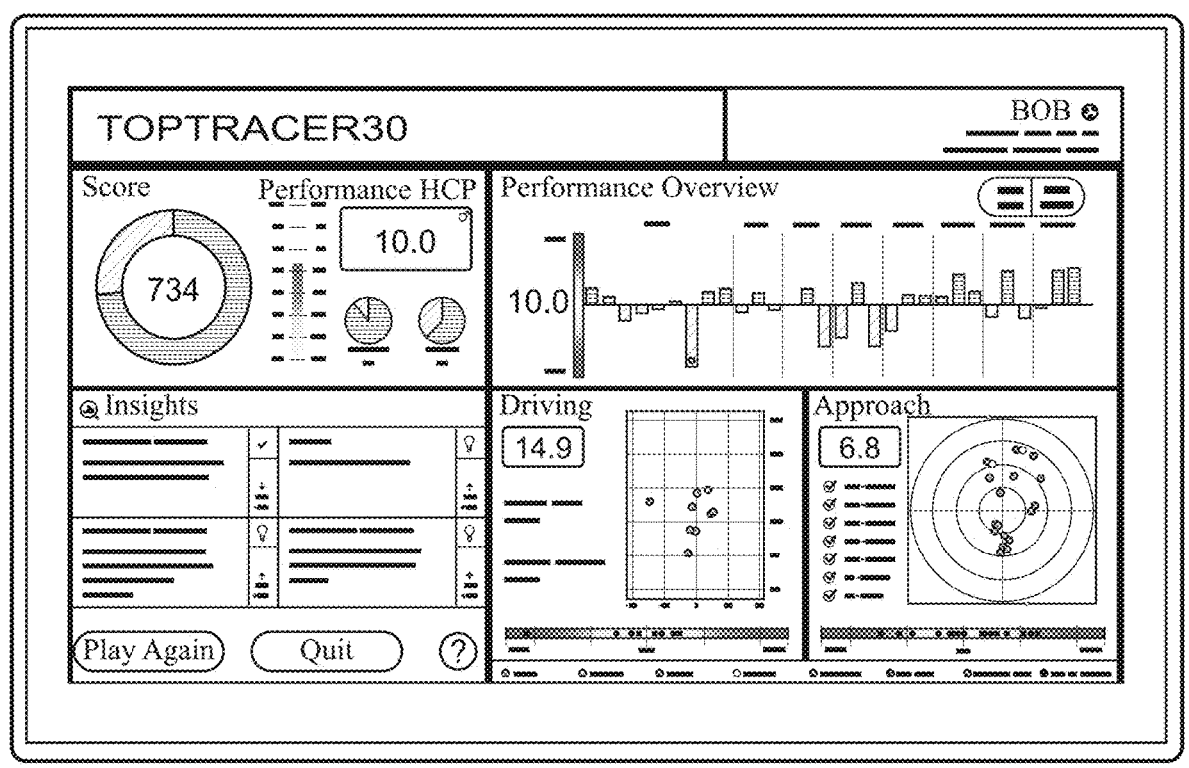
FIG. 9 is an illustration of a screenshot from a shot tracer application.

FIG. 9 is a screenshot 178 of a user's statistics page of a shot tracer application 65.

Thirkettle et al., U.S. Pat. No. 7,056,221 for a Ball Collection Arrangement, is hereby incorporated by reference in its entirety.

Golliffe et al., U.S. Pat. No. 7,059,974 for Golf Balls With Impact Resistant Identification Device, is hereby incorporated by reference in its entirety.

Thirkettle et al., U.S. Pat. No. 7,160,196 for an Identification Device, is hereby incorporated by reference in its entirety.

Thirkettle et al., U.S. Pat. No. 7,337,965 for a Ball Identifying Device, is hereby incorporated by reference in its entirety.

Savarese et al., U.S. Pat. No. 7,691,009 for Apparatus And Methods Relating To Findable Balls, is hereby incorporated by reference in its entirety.

Savarese et al., U.S. Pat. No. 7,766,766 for Methods And Apparatus Relating To Findable Balls, is hereby incorporated by reference in its entirety.

Cheng, U.S. Pat. No. 7,806,777 for Automatically Adapting Virtual Equipment Model, is hereby incorporated by reference in its entirety.

Cheng, U.S. Pat. No. 7,847,808 for Photographic Mapping In A Simulation, is hereby incorporated by reference in its entirety.

Savarese et al., U.S. Pat. No. 8,002,645 for Apparatus, Methods And Systems Relating To Findable Balls, is hereby incorporated by reference in its entirety.

Cheng, U.S. Pat. No. 8,029,359 for Providing Offers To Computer Game Players, is hereby incorporated by reference in its entirety.

Forsgren, U.S. Pat. No. 8,077,917 for Systems And Methods For Enhancing Images in A Video Recording of A Sports Event, is hereby incorporated by reference in its entirety.

Caster et al., U.S. Pat. No. 9,132,326 for a System For Providing Loaner Clubs To Novice Golfers, is hereby incorporated by reference in its entirety.

Forsgren, U.S. Pat. No. 10,596,416 for a System And Method For Three Dimensional Object Tracking Using Combination of Radar And Image Data, is hereby incorporated by reference in its entirety.

Semsak et al., U.S. Pat. No. 10,799,770 for a RFID Golf Ball Testing Apparatus, is hereby incorporated by reference in its entirety.

Johansson et al., U.S. Pat. No. 10,898,757 for Three Dimensional Object Tracking Using Combination of Radar Speed Data And Two Dimensional Image Data, is hereby incorporated by reference in its entirety.

Forsgren et al., U.S. Pat. No. 11,335,013 for Three Motion Based Pre-Processing Of Two-Dimensional Image Data Prior To Three-Dimensional Object Tracking With Virtual Time Synchronization, is hereby incorporated by reference in its entirety.

Levin, U.S. Pat. No. 11,409,411 for a Single Finger User Interface Camera Control, is hereby incorporated by reference in its entirety.

Johansson et al., U.S. Pat. No. 11,504,582 for Three Dimensional Object Tracking Using Combination of Radar Speed Data And Two Dimensional Image Data, is hereby incorporated by reference in its entirety.

Hugmark et al., U.S. Pat. No. 11,644,562 for Trajectory Extrapolation And Origin Determination For Objects Tracked In Flight, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A system for providing shot tracking data to a client device, the system comprising:
    a plurality of tracking sensors positioned at a venue;
    at least one shot application programming interface (API) configured to receive shot data from each of the plurality of tracking sensors at the venue; and
    a shot API proxy;
    a client/authentication provider engine;
    wherein the shot API proxy is configured to receive shot data from each of the shot API;
    wherein the shot API proxy is configured to receive a call for shot data from a remote client device;
    wherein the client/authentication provider engine authenticates the call for shot data from a remote client device;
    wherein the shot API proxy is configured to transmit shot data to the remote client device.

2. The system according to claim 1 further comprising an analytics provider for analyzing the shot data.

3. The system according to claim 1 further comprising a client authentication provider configured to authenticate incoming client requests from the client device.

4. The system according to claim 1 further comprising a request resolver configured to implement a venue lookup mechanism to resolve a target shot API path.

5. The system according to claim 1 wherein the client device is a mobile communication device.

6. The system according to claim 1 wherein each of the plurality of tracking sensors is a camera sensor.

7. The system according to claim 1 wherein each of the plurality of tracking sensors is a radar sensor.

8. The system according to claim 1 wherein the client device comprises a mobile app.

9. The system according to claim 1 wherein the shot API proxy runs on a cloud server.

10. The system according to claim 1 wherein the shot API runs at a local server with a local database.

11. A method for providing shot tracking data to a client device, the method comprising:
    generating shot data at a plurality of tracking sensors positioned at a venue;
    receiving, at a shot application programming interface (API), shot data from each of the plurality of tracking sensors;
    receiving shot data at a shot API proxy from the shot API;
    receiving a call for shot data at the shot API proxy from a client device;
    authenticating, at a client/authentication provider engine, the call for shot data from the remote client device; and
    transmitting the shot data from the shot API proxy to the client device.

12. The method according to claim 11 further comprising analyzing the shot data at an analytics provider.

13. The method according to claim 11 further comprising authenticating incoming client requests from the client device at a client authentication provider.

14. The method according to claim 11 further comprising implementing, at a request resolver, a venue lookup mechanism to resolve a target shot API path.

15. The method according to claim 11 wherein the client device is a mobile communication device.

16. The method according to claim 11 wherein each of the plurality of tracking sensors is a camera sensor.

17. The method according to claim 11 wherein each of the plurality of tracking sensors is a radar sensor.

18. The method according to claim 11 wherein the client device comprises a mobile app.

19. The method according to claim 11 wherein the shot API proxy runs on a cloud server.

20. The method according to claim 11 wherein the shot API runs at a local server with a local database.

* * * * *